Jan. 28, 1947.  L. R. EVANS  2,414,861
ADJUSTING MEANS FOR THE TAIL CENTERS OF LATHES
Filed April 15, 1944
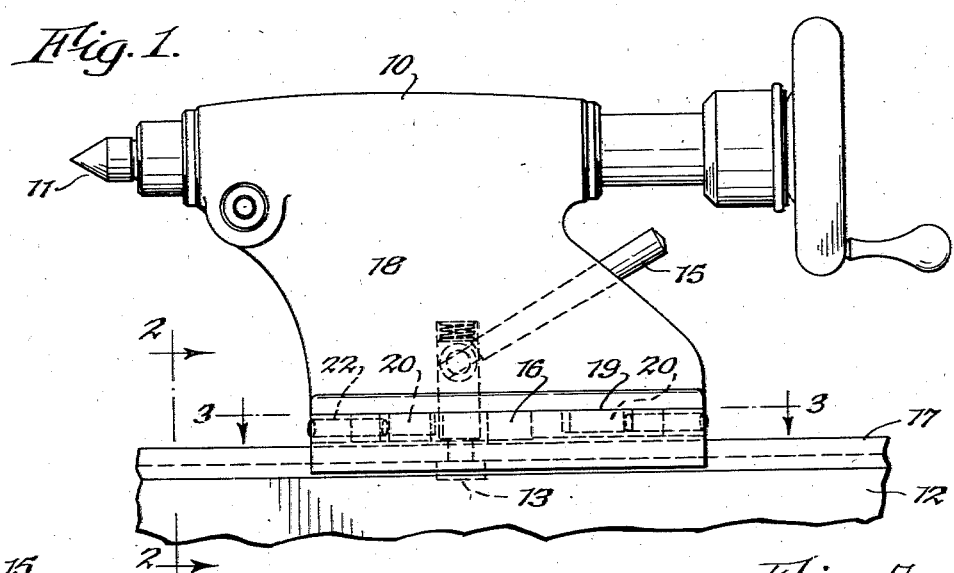
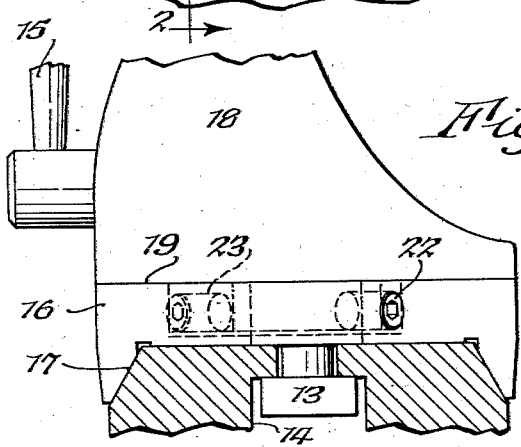
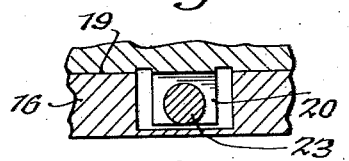
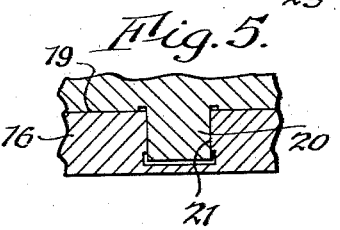
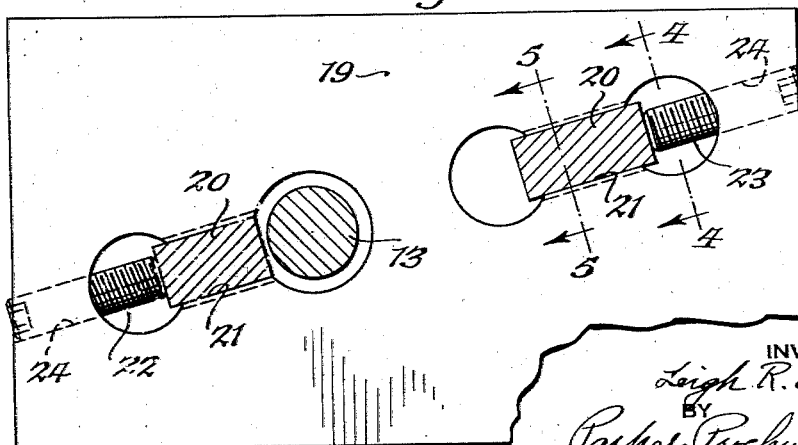
INVENTOR
Leigh R. Evans,
BY
Parker Prochnow Farmer,
ATTORNEYS Patented Jan. 28, 1947

2,414,861

UNITED STATES PATENT OFFICE 2,414,861

ADJUSTING MEANS FOR THE TAIL CENTERS OF LATHES

Leigh R. Evans, Elmira, N. Y., assignor to Hardinge Brothers, Inc., Elmira, N. Y.

Application April 15, 1944, Serial No. 531,139

1 Claim. (Cl. 82—31)

This invention relates to improvements in the tailstocks of metal cutting lathes and more particularly to improved means for laterally or transversely adjusting the tail center of a precision lathe.

Prior to my invention, lathe tailstocks were known which were provided with means for adjusting the tail center transversely to its axis, but such previous means for this purpose were not capable of readily effecting the extremely fine adjustment that is required in some classes of work, as for instance, when it is necessary to machine a piece of work to specified dimensions within as little as one five-thousandth or one ten-thousandth of an inch tolerance. If, for example, it be required to turn a cylinder of uniform diameter throughout its length within such minute tolerance limits, necessarily the tail center must be alined with the axis of the headstock with extreme precision or within the limits of such tolerances.

A primary object of my invention is to provide a fine adjusting means of novel, improved construction whereby such precision transverse adjustments of the tail center can be readily effected with certainty.

Further objects and advantages of the invention will appear from the following specification of the preferred embodiment of the invention shown in the accompanying drawing, and the novel features of the invention are set forth in the appended claim.

In said drawing:

Fig. 1 is a front elevation of the tailstock and a portion of the bed of a lathe provided with adjusting means embodying my invention.

Fig. 2 is a fragmentary, transverse, sectional elevation thereof on line 2—2, Fig. 1.

Fig. 3 is a sectional plan view thereof on line 3—3, Fig. 1.

Figs. 4 and 5 are vertical, sectional views thereof on lines 4—4 and 5—5, respectively, Fig. 3.

In the embodiment of my invention, illustrated in the drawing, the tailstock 10, carrying the tail center or spindle 11, as usual, is mounted for longitudinal adjustment on the lathe bed 12 toward and from the work, or the headstock of the lathe (not shown), and is provided with means, such as the customary T-bolt 13 operating in a longitudinal T-slot 14 in a lathe bed and adapted to be actuated by a cam or eccentric having an operating handle or lever 15 for stationarily securing the tailstock in the required position lengthwise of the bed and releasing it for longitudinal adjustment.

The tailstock comprises a sub-base 16 which bears on the lathe bed and is guided longitudinally thereon by ways or guide means 17 of any usual or suitable form, and a body, standard or center support 18 which is mounted on the sub-base 16 so as to permit transverse or lateral adjustment of the body on the sub-base. The cam or eccentric for actuating the T-bolt 13 is mounted in the body 18 and, when operated, acts to clamp and secure both the tailstock body and its sub-base in the positions lengthwise of the bed 12 to which they may be respectively adjusted, or to release them. In the preferred construction, illustrated in the drawing, the tailstock body 18 has a flat, horizontal bottom face which rests on the flat, horizontal top face 19 of the sub-base, and the body 18 is provided with two guide tongues or members 20 which project downwardly from the bottom of the body 18 into alined guideways or slots 21 in the sub-base, these guide tongues having a close sliding fit in the guideways so as to permit horizontal adjustment of the tailstock body 18 in the direction of the length of said guideways without lateral play or motion therein. The guide tongues and ways thus provide guide means between the body and sub-base of the tailstock, comprising a guide member on one of said parts slidably engaging a guide on the other part so as to permit a straight line adjustment of the body on the sub-base only in the direction of the length of the guide. While two spaced projections 20 entering two guide slots 21 at opposite sides of the T-bolt 13 are shown in the drawing, the projections and slots are, in effect, and may be considered as, spaced portions of a single guide tongue and guideway which are spaced or interrupted to accommodate the T-bolt between them.

The adjustment of the tailstock body on its sub-base is effected, preferably by screw means mounted on one of said parts and operatively engaging the other part. This adjusting means, as shown in the drawing, comprises two opposed adjusting screws 22 and 23, each arranged to turn in a screw threaded bore 24 in the sub-base, with the inner end of one screw 22 abutting against the outer end of one guide tongue 20, and the inner end of the other screw 23 abutting against the oppositely facing outer end of the second tongue 20. The outer ends of the two screws, which are exposed at the opposite ends of the sub-base, are suitably fashioned, as with non-circular sockets, for the engagement of a tool for turning the screws. By backing off one screw away from its related guide tongue and advancing the other screw toward its related guide tongue, the tailstock body can be adjusted lengthwise of its guide in one direction, and by opposite operations of the two screws, the tailstock body can be adjusted in the opposite direction, while by tightening either screw, the guide tongues can be clamped and held from movement between the opposite screws, thus firmly securing the tailstock body 18 stationarily on the sub-base in whatever position to which it may have been adjusted by operation of the screws.

As is clearly shown in Fig. 3, the guide 21 extends in a direction at an inclination or obliquely to the axis of the tail center or the direction of longitudinal adjustment of the tailstock on the lathe bed, so that by adjusting the body 18 lengthwise of the guide 21, by means of the screws 22 and 23 in one direction or the other, the body 18 with the tail center will be shifted or adjusted transversely, or forwardly or rearwardly relatively to the sub-base, due to the inclination of the guide 21. The extent of this transverse adjustment of the body on the sub-base for a particular movement of the adjusting screws is determined by the angularity of the guide 21 to the longitudinal axis of the tail center. Preferably, the guide 21 extends at a relatively small, acute angle to the axis of the center so that the transverse adjustment of the body on the sub-base is only a minor fraction of the movement of the body lengthwise of its guide 21 to effect the adjustment. Manifestly, only a relatively small movement of the body 18 lengthwise of its guide 21 is effected by a portion of one revolution of the adjusting screws, the length of such movement depending upon the pitch of the threads of the screws. Therefore, since the extent of the transverse adjustment of the tailstock body on the sub-base is only a minor fraction of the extent of its longitudinal movement along its guide on the sub-base, it will be appreciated that extremely fine or minute transverse adjustments of the tailstock body and center relatively to the axis of the head center can be quickly and easily effected with great precision by this described adjusting means.

The T-bolt 13, in addition to clamping the tail stock assembly in the desired positions lengthwise of the lathe bed 12, also clamps the body 18 to the sub-base 16 and prevents lifting of the body from the sub-base, so that straight parallel-sided guide means may be used for providing lateral adjustment of the body on the sub-base. This construction permits movement of the tail stock assembly throughout the length of the lathe bed without changing the lateral adjustment of the housing 18 relatively to the sub-base.

I claim as my invention:

In a lathe having a tailstock including a sub-base and a tail center support which is adjustable transversely on said sub-base, the improved construction comprising means for guiding said center support in its transverse adjustments on said sub-base including a straight parallel sided guideway in said sub-base extending in a direction at an acute angle to the axis of the tail center, and a fixed guide projection on the center support confined and slidable longitudinally in said guideway, and opposed screws on said sub-base acting oppositely on said guide projection for adjusting and securing said projection longitudinally in said guideway.

LEIGH R. EVANS.